United States Patent [19]

Sprenger

[11] Patent Number: 4,530,865
[45] Date of Patent: Jul. 23, 1985

[54] CABLE PROTECTION DEVICE

[76] Inventor: Walter Sprenger, Algersdorf 4, D-8565 Kirchensittenbach, Fed. Rep. of Germany

[21] Appl. No.: 565,213

[22] Filed: Dec. 23, 1983

[30] Foreign Application Priority Data

Dec. 30, 1982 [DE] Fed. Rep. of Germany ....... 8236831
Apr. 30, 1983 [EP] European Pat. Off. .......................... 83104253.6[U]

[51] Int. Cl.³ .............................................. B32B 27/00
[52] U.S. Cl. .......................................... 428/36; 428/35
[58] Field of Search ..................................... 428/36, 35

[56] References Cited

U.S. PATENT DOCUMENTS 4,276,332 6/1981 Castle ..................................... 428/36
4,413,656 11/1983 Pithouse .............................. 138/110
4,435,242 3/1984 McNulty ............................. 156/264

Primary Examiner—Christopher A. Henderson
Attorney, Agent, or Firm—Browdy and Neimark

[57] ABSTRACT

A cable protecting device includes a closable, longitudinal, hollow body of plastic, rubber or the like, in particular for the supplementary laying of cables along walls, floors or furniture.

In order to create a cable protecting device which can be inexpensively manufactured as an endless profile, is visually unobtrusive when installed, is easily laid, and finally enables easy placement of the individual cables into it, the cable protecting device has two legs (1", 2") joined with one another longitudinally, which are disposed at right angles to one another or can be brought into a position at right angles to one another, and at least one covering (3", 4") closing off the hollow space defined by the legs (1", 2") in their position at right angles to one another is joined with one leg (1", 2") in such a manner that this covering can be folded back elastically.

14 Claims, 5 Drawing Figures

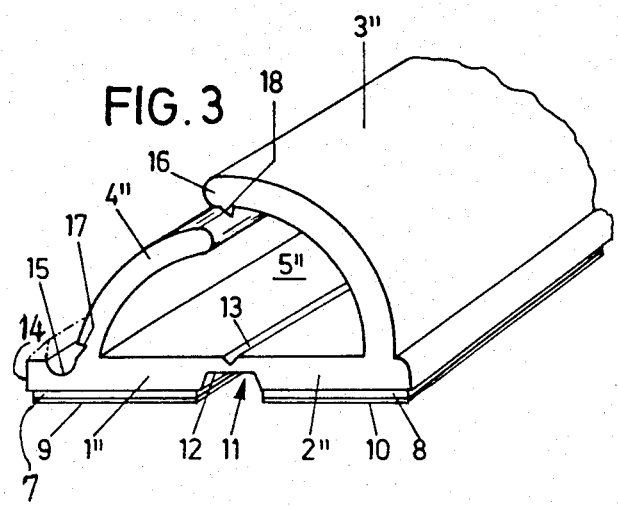
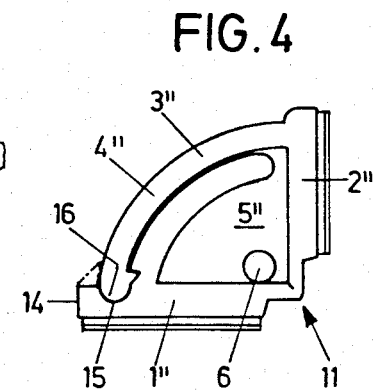
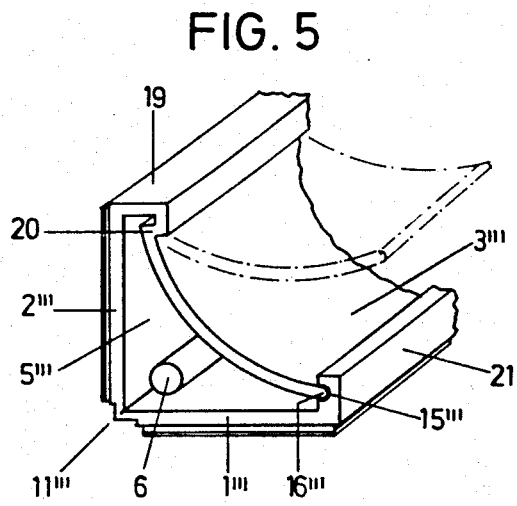

CABLE PROTECTION DEVICE

BACKGROUND OF THE INVENTION

The invention is directed to a cable protecting device of the kind including a closable, elongated, hollow body of plastic, rubber or the like, in particular for laying cables along walls, floors and furniture. Cable protecting devices of this kind are already known, for instance in the form of baseboard molding strips of relatively wider width and having a rectangular cross section. It is furthermore also known to provide cable ducts that can be covered, for instance in office floors; in that case, however, the various cables are run in the open to these ducts, so they are unprotected and freely visible there.

Although the known devices of this kind do fulfill very well the purpose of protecting the laid cables, they are nevertheless usually relatively noticeable and thus not very satisfactory from an esthetic standpoint; they are also laborintensive to manufacture and therefore are often relatively expensive, and finally they are not easy enough to put into place that private consumers who are relatively unskilled could lay them without difficulty.

OBJECTS OF THE PRESENT INVENTION

Taking the above as a point of departure, it is the object of the invention to create a cable protecting device which, having a continuous profile, can be inexpensively produced; which is visually unobtrusive; which is easy to lay; and which finally permits easy placement of the individual cables inside it.

This object is attained in accordance with the invention, in a cable protecting device of the generic type described above, in that it has two legs joined to one another in the longitudinal direction, which are either disposed at right angles to one another or can be brought into a position at right angles with one another, and in that at least one covering, which closes off the space defined by the legs in their position at right angles to one another, is joined to one leg such that it can be folded back elastically. The shaping provided according to the invention makes it possible to lay the cable protecting device along any desired rectangular edges, whether between a wall and the floor, for instance, or at the transition between the underside of a desk top and the associated body of the desk. The one-piece embodiment of the cable protecting device, which comprises only two legs and at least one covering, makes possible an endless production process in a particularly simple manner. Preferable materials are rubber or sufficiently soft plastics, such as soft polyvinylchloride (soft PVC) or sufficiently soft polyethylene (PE).

If the arms are articulatedly connected with one another as in an advantageous embodiment, then the cable protecting device can be manufactured such that its legs are located in one plane and are then brought into a position at right angles with one another only during the process of laying the cable protecting device. This makes manufacture substantially easier, because the covering is free of the other leg, with which it is not connected. Imparting this shape during manufacture furthermore makes it possible to wind up the cable protecting device, because in this form it is not rigid.

Transporting it and storing it ready for sale are more easily accomplished as a result. Standard sizes several meters in length can be wound up relatively compactly. During laying, with the legs placed in the perpendicular position, the cable protecting device thereby attains substantially greater rigidity already.

If in accordance with a further advantageous embodiment of the invention, the covering connected with the one leg can lock into a latch recess associated with the other leg, then after the inlaying of a cable and the subsequent locking of the covering the result is a tight and rigid joining of the two legs and the covering, so that the cable is supported in a mechanically reliable and moisture-proof manner, even though the cable protecting device is made of material that is inherently relatively soft.

If the chord of the covering is longer in the non-latched state than the distance between where the covering is joined to the one leg and the latch recess, then the covering is furthermore placed under tension during locking, which not only increses the tightness of the connection between the covering and the leg in the area of latching but also increases the rigidity of the covering, which of course is the part most likely to be subject to mechanical strains.

In an advantageous manner, the covering is also curved, either convexly or concavely. If the covering has a concave curvature, then in accordance with a further advantageous embodiment of the invention the latch recess is embodied in a projection from the other arm.

According to a further embodiment of the invention, the covering is provided in its latching area with a barb-like protrusion, which is latchable in a groove adapted in cross section to the protrusion and associated with the latch recess, thereby placing the covering under tension against the latch recess. By means of this provision it is attached that the connection between the covering and the associated leg that can be effected by means of latching is so solid that it cannot be released unintentionally. On the other hand, however, it is easily released, for instance by pressing down on the leg in the vicinity of the latch recess with a screwdriver or some other flat object, thus relieving the tension.

The embodiment may advantageously be selected such that one covering each is provided in the vicinity of the outer edge of each leg, with the coverings thus formed overlapping one another at least partway. Particularly good protection in mechanical terms as well as watertight and dustproof protection of the cables laid in the cable protecting device are thereby attained.

Ease of laying the cable protecting device is promoted not only by its inherent elasticity but also by the fact that at least one outer surface of the arms is provided with a self-adhesive coating provided with a peel-off backing. The latter may be ribbed like crepe paper, thereby facilitating storage and sale from the roll. After the backing is peeled off, the laying is accomplished simply by pressing in place. Instead of a self-adhesive coating of this kind, laying may naturally be accomplished by using pieces having an angled profile, which are secured at the appropriate location and into which the cable protecting device is then pressed into place.

The cable protecting device is thus equally well suited to laying television antenna cables, loudspeaker cables, lines for doorbells and home telephones, two-way intercom systems and the like in the home, as well as for incoming telephone lines, intercom system lines, data transmission lines and the like in the office.

BRIEF DESCRIPTION OF THE DRAWING

Further characteristics, advantages and details of the invention will become apparent from the ensuing description of forms of embodiment, referring to the drawings, in which:

FIG. 3, an end-on perspective view of a third embodiment in the unlaid state;

FIG. 4, an end-on view of the embodiment of FIG. 3, in the laid state; and

FIG. 5, an end-on perspective view of a fourth embodiment.

DETAILED DESCRIPTION OF THE INVENTION

Figure 1:
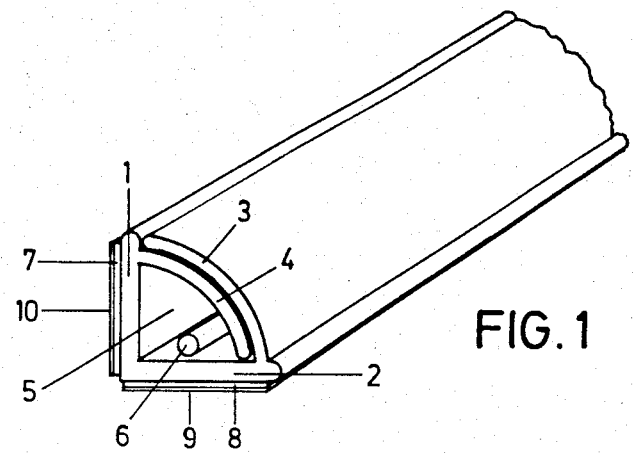
FIG. 1, a end-on perspective view of a first embodiment.

The embodiment of a cable protecting device shown in FIG. 1 has two legs 1 and 2 defining a right angle. On the ends of the legs 1 and 2, respectively, coverings 3 and 4 having the cross section of an arc of a circle are provided, with the (inner) covering 4 being disposed offset somewhat to the inside on the end of the leg 1, so that the (outer) covering 3 can lap over the free longitudinal edge of the leg 1 so as to close it off in a visually pleasing way. A hollow space 5 is enclosed between the legs 1, 2 and the coverings 3, 4, and a cable 6 shown schematically in the drawing is laid in this hollow space 5. Because of the rubber-like, that is, soft-elastic material used, the coverings 3 and 4 have an inherent elasticity such that they can be folded back elastically in order to allow a cable to be placed in or removed from the hollow space.

The cable protecting device is secured via self-adhesive coatings 7 and 8, which are each covered by a peel-off backing 9, 10 that is easily removed when the device is to be laid. All that needs to be done then is to press the one leg 1 against the base of a wall and the other leg 2 against the floor.

Figure 2:
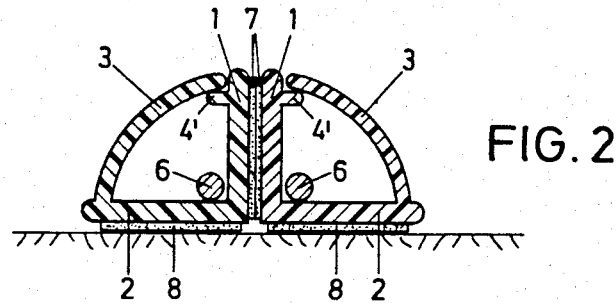
FIG. 2, a cross section taken through a second embodiment.

The embodiment shown in FIG. 2 differs from that shown in FIG. 1 only in that the inner covering 4' is embodied with a substantially shorter length and thus in a practical sense it now merely acts as a sealing stop for the true covering 3.

FIG. 2 shows a type of laying that is particularly appropriate for laying cable in the open on the floor, because by joining together two cable protecting devices according to the invention a completely rounded upper surface which does not present corners to be tripped over or damaged is attained. The self-adhesive coatings 7 of the vertical legs 1 here serve to join the two cable protecting devices with one another, while the self-adhesive coatings 8 of the horizontal legs 2 effect the securing of the device to the floor.

Cables 6 can be placed in the cable protecting device particularly simply by grasping the cable 6 that is to be laid with a sort of crocheting hook or the like and introducing it into the cable protecting device by elastically folding back the covering 3, and 4 if applicable, at some point. The tool being used then needs merely to be guided along the cable protecting device, with its tip remaining in the interior, whereby the cable 6 slides effortlessly into the cable protecting device.

As shown in FIG. 3, a cable protecting device can also be produced in such a manner that the two legs 1" and 2" are located in a common plane and joined to one another by means of an elastic joint 11 which enables folding of the two legs 1", 2" up into a position at right angles to one another as shown in FIG. 4. An elastic joint of this kind is fabricated by reducing the thickness of the legs 1", 2" in this vicinity, to which end an outer longitudinal groove 12 and an inner notch 13 oriented toward the hollow space 5" are provided. Between the free longitudinal edge 14 of the leg 1" and the inner covering 4", a latch recess 15 extending continuously in the longitudinal direction is embodied in the leg 1", having an approximately semicircular cross section. In shape, it is adapted to the longitudinal edge, forming one latch area 16, of the outer covering 3". Immediately above the latch recess 15, at the transition between the leg 1" to the inner covering 4", there is a groove 17 which in cross section is adapted to a barb-like protrusion 18 that also extends in the longitudinal direction and is embodied adjacent to the latch area on the inside of the outer covering 3". This protrusion 18 is disposed such that after it has been pressed into the groove 17 the latch area 16 of the outer covering 3" is pressed into the latch recess 15; thus the two parts are elastically deformed and thus placed under tension in this area.

As may be seen from a comparison of FIG. 3 with FIG. 4, the outer covering 3" has a flatter curvature when in the untensed state than in the tensed state. The length of the chord between the point of junction with the leg 2" and its latch area 16 is thus greater in the untensed state than in the tensed state.

In this embodiment as well, the legs 1" and 2" are provided with respective self-adhesive coatings 7 and 8, to which peel-off backings 9 and 10 are applied. The application of a self-adhesive coating of this kind can be accomplished particularly simply in this case, because it can be done with the legs 1" and 2" in the position relative to one another that is shown in FIG. 3. In this case, a wide self-adhesive coating with a peel-off backing may be applied, and then in the vicinity of the outer longitudinal groove 12 a corresponding strip can be cut out.

The embodiment according to FIGS. 3 and 4 is also in one piece. In this embodiment again, the coverings 3" and 4" are curved convexly, or in other words toward the outside.

In the embodiment according to FIG. 5, two legs 2''' and 1''' again joined by means of an elastic joint 11''' are provided. A covering 3''' is joined to the leg 2''' via a projection 19 offstanding from this leg 2'''. A further elastic joint 20 is embodied between the projection 19 and the covering 3'''.

The covering 3''' is concave in embodiment; that is, when the legs 1''', 2''' are in the position at right angles to one another it curves toward them.

Another projection 21 projects upward from the free edge of the other leg 1''', and a latch recess 15''' which likewise extends in the longitudinal direction of the cable protecting device is embodied on the side of the projection 21 oriented toward the hollow space 5'''. This latch recess is adapted in cross section to the corresponding latch area 16''' of the covering 3'''. Here again the covering 3''' is tensed elastically toward the hollow space 5''' when it locks into the latch recess 15'''. The dot-dash representation of the covering 3''' shows it in a folded-back position in which it is possible to emplace or remove a cable 6. This position with respect to the leg 2''' corresponds approximately to the position in which the cable protecting device was injected or extruded, with the other leg 1''' then in any event being in a position of alignment with respect to the leg 2'''.

In the form of embodiment shown in FIGS. 3–5, the laying of cables 6 can be accomplished similarly to the form of embodiment of FIGS. 1 and 2. The locking of the covering 3'' or 3''' into the latch recess 15 or 15''' can be accomplished by hand. To release this latch connection, a screwdriver and a comparable flat tool are used, by means of which an intervention is made from outside into the latch recess.

The cable protecting device is also suitable for laying television antenna cables, loudspeaker cables, doorbell and home telephone lines, two-way intercom systems and the like in the home, as well as for incoming telephone lines, intercom system lines, data transmission lines and the like in the office.

In order to attain adaptability to various kinds of interior decoration, the outer covering 3, 3', 3''' may have a decorative surface; even a relief pattern is possible. It may for instance be provided that the surface have the appearance of wood, with the proper relief pattern being augmented by appropriate coloring.

For successful realization of the cable protecting device according to the invention, it is particularly important that the outside surfaces of the legs that are to receive an adhesive layer be provided with a primer coat before the adhesive layer is applied, in order to prevent solvent from leaching out after manufacture into the adhesive layer, which could impair the durability of the adhesive bond.

I claim:

1. A cable protector device for protectively enclosing a cable having a longitudinal extent, comprising:
   a first longitudinally extending leg;
   a second longitudinally extending leg joined, at an angle, to said first leg;
   said first and second legs defining therebetween a space for receiving the cable;
   a first longitudinally extending arm extending away from said first leg into said space, said arm including at least one flexible cover portion extending toward, and engagable with, said second leg;
   said at least one cover portion, when engaged with said second leg, forming with said first and second legs a hollow body for enclosing the cable;
   said first and second legs, said first arm and said at least one cover portion being unitary with one another; and
   at least one surface of said first and second legs opposite said space including a self-adhesive coating covered by a peel-off-backing.

2. A cable protecting device as defined by claim 1, wherein said first and second legs are articulatedly joined with one another.

3. A cable protecting device as defined by claim 1, wherein said second leg includes a latch recess, said first leg including means for latching said at least one cover portion within said latch recess.

4. A cable protecting device as defined by claim 3, wherein the chord of said at least one cover portion in the non-latched state is longer than the distance between the connection of the cover portion to said first leg and the latch recess when the legs are disposed substantially at a right angle to one another.

5. A cable protecting device as defined by claim 1, wherein said at least one cover portion is curved.

6. A cable protecting device as defined by claim 3, wherein said at least one cover portion is concavely curved, and said latch recess is carried by a projection protruding from the other leg.

7. A cable protecting device as defined by claim 3, wherein said latching means includes a barblike protrusion, and said latch recess includes a groove corresponding in cross section to the protrusion, whereby when said protrusion is fitted within said groove, said at least one cover portion is tensed against said latch recess.

8. A cable protecting device as defined by claim 1, including two cover portions, each cover portion being provided in the vicinity of the outer edge of each leg, respectively, said two cover portions at least partly overlapping one another when the legs are positioned substantially at right angles to one another.

9. The closure of claim 1, wherein said second leg comprises a latching groove and said flexible cover portion comprises latching means on the free end thereof, said flexible cover portion latching means and said latching groove defining means for securing said first arm to said second leg.

10. The closure of claim 9, wherein said latching groove is correspondingly configured with said latching means.

11. The closure of claim 1, further comprising a second arm extending away from said second leg and into said space, said first arm overlapping said second arm.

12. The closure of claim 11, wherein said second arm includes a flexible cover portion extending toward said first leg, said first and second arms being complementarily convexly configured.

13. A cable protecting device for a cable having a longitudinal extent, comprising:
    a first planar leg having a longitudinal extent and a second planar leg having a longitudinal extent;
    said first and second legs being disposed in a common plane and having adjacent longitudinally extending edge portions joined along notched means for bending one of said first or second legs into a position substantially normal to the other of said first or second legs;
    said first and second legs including, on the same side of said common plane, adhesive means for securing said device to at least one support surface;
    the side of said first leg opposite said adhesive means including a flexible covering extending away from said opposite side, the free end of said covering including a latch protrusion,
    the side of said second leg opposite said adhesive means including a flexible cover extending away from said opposite side toward said flexible covering and a latch recess complementarily configured with said latch protrusion, said flexible cover being located closer to said notched bending means than said latch recess,
    whereby when one of said first or second legs is bent into said substantially normal position relative to the other of said first or second legs, said flexible covering latch protrusion is inserted into, and latched with, said latch recess so that a longitudinally extending closed housing is formed for protection of an enclosed cable.

14. The cable protecting device of claim 13, wherein said flexible covering has a length greater than said flexible cover, whereby when said closed housing is formed, said flexible covering overlaps said flexible cover.

* * * * *